Patented Dec. 13, 1932

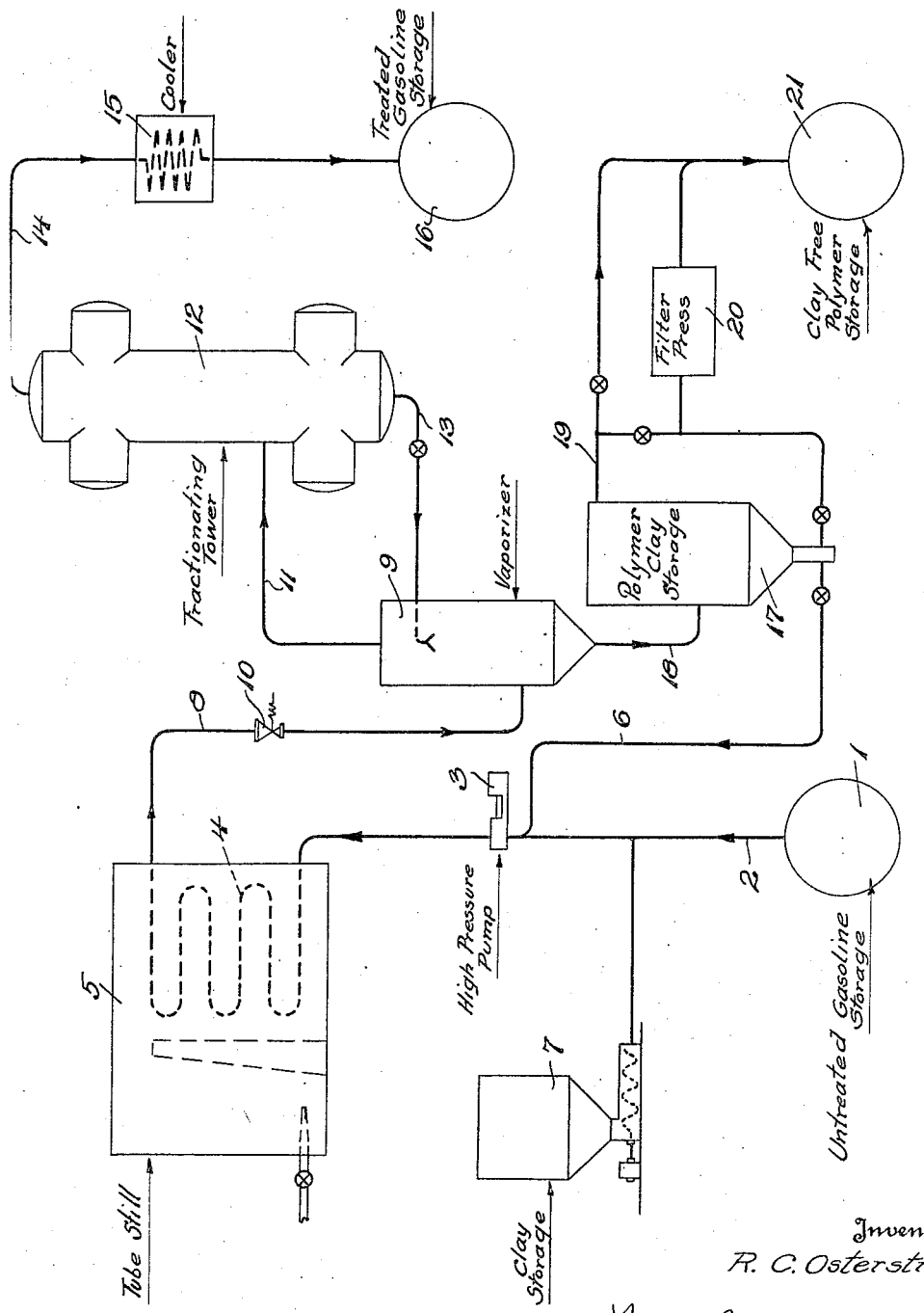

1,891,109

REISSUED

UNITED STATES PATENT OFFICE

RUDOLPH C. OSTERSTROM, OF CHICAGO, ILLINOIS, ASSIGNOR TO THE PURE OIL COMPANY, OF CHICAGO, ILLINOIS, A CORPORATION OF OHIO

OIL PURIFYING SYSTEM

Application filed February 18, 1930. Serial No. 429,303.

This invention relates to the art of purifying or refining hydrocarbon oils, and has specific reference to an improved method for treating hydrocarbon oils which contain undesirable compounds, such as gum-forming and color-imparting bodies and to a new treatment involving the heating of the oil when in the presence of a contact or catalytic material, whereby to separate effectively the undesirable compounds from the purified or treated oils.

In accordance with the present invention this object is attained by passing the oils to be treated in a continuously moving stream through a heating still in the presence of a catalyst such as fuller's earth and therein heating the oils while under superatmospheric pressures to high temperatures, whereby to produce polymerization of the undesired compounds in the oils so that through subsequent fractionation such polymerized oils, which have high boiling points, may be removed from the lower boiling desired oils.

It is an outstanding feature of the present invention to provide for the cyclic return of the fuller's earth or of the catalyst to the treating zone in order that said catalyst may be used repeatedly in the operation of the system.

In accordance with the present invention, I have found that a treating agent such as fuller's earth possesses effective catalytic properties after a single passage thereof through the treating zone, particularly after the catalyst or treating agent, prior to being re-introduced into the treating zone, is brought into contact with the fresh charging stock. Such a charging stock appears to possess solvent properties by which the adsorbed or polymerized compounds present in the treating agent are removed so that said treating agent will be reactivated for operation in the treating zone. In this connection I have also found that the polymerized or undesired oils if re-introduced into the treating zone possess catalytic activity in furthering polymerization reactions in the stock initially undergoing treatment and in the preferred operation of my system I return a certain percentage of the polymerized oils together with the fuller's earth or other treating agent to the heating zone.

By this method of operation I provide for the full revivification of the catalyst or treating agent and the purifying of the oil in a treating process of this character to the end of effecting a direct economy in the consumption of the treating agent, the cost of which being a very important item in a process of this character.

For a further understanding of this invention reference is to be had to the following description and the accompanying drawing, in which:

The figure is a diagrammatic view showing one arrangement of apparatus suitable for use in the practice of my invention. This figure is provided with legends and other features adapting it to serve also as a flow sheet.

The numeral 1 designates a tank adapted for the reception of an untreated mineral oil. Leading from the tank 1 is a pipe line 2 in which is located a high pressure pump 3 by which the oil under treatment is forced through the coil 4 of the heating still 5. Entering the inlet side of the pump 3 is a pipe line 6 through which is passed or drawn a treating agent, which in this instance consists of what may be termed a "fluid mixture" of fuller's earth and liquid oil, the latter consisting of a high percentage of high boiling products obtained by the cyclic operation of the system. Also connected with the pipe line 2 is a clay feeding unit 7 which is under ready control for the purpose of regulating the input of fresh fuller's earth into the system, as such additional quantities of earth are required. The amount of fresh clay added to the system is, of course, much less than that in earlier systems wherein no re-circulation of the treating agent is provided.

Within the tube still 5 the oils obtained from the tank 1 and also the treating agent are subjected to temperatures above the vaporizing temperatures of the oils under treatment, for example 650° F. to 700° F., vaporization of the oils however being prevented by the employment of super-atmospheric pressures sufficiently high to maintain the oil in the liquid phase. These pressures will, of course, vary in accordance with the operating temperatures applied to the oils in the still. While the oils are maintained in this highly heated condition and in the liquid phase they react freely with the finely divided fuller's earth present therein to permit of the subsequent separation of the undesirable compounds from the desired compounds present in the oil undergoing treatment. In all probability the heating of the oils to a high temperature without substantial cracking thereof while the oils are maintained in the liquid phase and in the presence of the treating agent effects polymerization of the undesirable gum-forming and color-imparting bodies or again the undesirable bodies may be adsorbed by the treating agent. The fuller's earth may serve as a catalyst in promoting polymerization reactions or it may be considered an adsorbent.

From the pipe still 5 the treated oils pass by way of a pipe line 8 to a separator 9. The line 8 contains a pressure relief valve 10 so that the oils in the separator 9 are permitted to freely expand in order that there may take place an effective separation of the heavy clay containing undesirable compounds as liquids from the desired low boiling compounds in the form of vapors. The latter remain in the vapor phase and pass overhead from the separator to a very large extent free from the higher boiling undesirable compounds. These vapors pass through a line 11 to a standard fractionating tower 12. In this tower the vapors are subjected to fractionation in order to remove from the vapors all the entrained desired low boiling compounds. These latter compounds cool as a liquid in the bottom of the fractionating tower and may be returned to the top of the vaporizer by the pipe 13, where they are employed to scrub the vapors passing upwardly through the separator. A pipe line 14 leads from the top of the tower to a condenser 15 and thence to a storage tank 16 which receives the treated and purified hydrocarbons.

One of the outstanding features of the present invention resides in collecting the high boiling or undesired liquid oils and clay in the bottom of the separator and then passing this mixture into a storage tank 17 by the employment of the pipe line 18. The bottom of the tank 17 connects with the pipe line 6 and is suitably valved in order to regulate the return of the clay-oil mixture to the inlet side of the pump 3. By this arrangement the fuller's earth is again returned to the inlet side of the pipe still for re-circulation through the heating zone thereof in connection with the fresh charging stock. The excess heavy oil and clay materials which accumulate in the tank 17 are removed by way of the pipe lines 19 and passed preferably through a filter 20 in order to effect the separation of the clay or fuller's earth in cake-like form from the liquid oils, the clay-free liquid oils are then transferred to a storage tank 21.

The system as above described has the advantage over prior systems in the matter of providing for complete separation of the undesired compounds from the oil undergoing treatment in order that the purified oils will possess the desired color and freedom from other injurious compounds, and especially is the invention described an improvement on earlier systems by the cyclic circulation of the treating agent. This step results in reducing the quantity of clay or other corresponding treating agent necessary to effect a given degree of purification of the oils undergoing treatment. Instead of eliminating the clay from the system at the end of each complete operation I have provided for its reuse or re-circulation. Heretofore such a treating agent as fuller's earth has been removed at the end of each operation as, for example by a filter press, dried and then burned to restore its effectiveness as a catalyst. I have found, however, that by combining the treating agent with the fresh entrained stock such burning or revivification of the treating agent is not required, and this discovery has made the present invention of greater advantage commercially over the earlier and so-called "once through" systems of purification.

The present invention is a continuation in part of my prior application Serial Number 405,251, filed November 6, 1929, and distinguishes from said prior application by the fact that the oils in the treating zone are maintained in the liquid phase by the employment of super-atmospheric pressures instead of being permitted to vaporize as set forth in said application.

What is claimed is:

1. The method of removing gum-forming and color-imparting bodies from cracked low boiling petroleum oils containing large quantities of unsaturated hydrocarbons which comprises: heating a confined flow-stream composed of such an oil and a finely divided solid treating agent in a heating zone to a temperature above the vaporization point of the oil while applying pressure to the stream to prevent substantially the evolution of oil vapor, maintaining said flow stream in said zone under said conditions of temperature and pressure for a sufficient period of time to effect polymerization of the undesired hydrocarbons, then passing the flow-stream under materially reduced pressures through a vaporizing zone maintained at a temperature to keep in a vaporous state the desired treated oils and separate therefrom higher boiling polymerized oils and said treating agent, and returning a portion, at least, of said polymerized oils and treating agent to said heating zone for repassage through said heating zone in admixture with fresh oils.

2. The method of treating cracked low boiling petroleum oils containing high percentages of unsaturated hydrocarbons to remove objectionable gum-forming and color-imparting bodies therefrom which comprises: continuously heating a confined flow-stream composed of such an oil and a finely divided solid treating agent during passage through a heating zone to a temperature above the vaporization point of the oil and below a temperature wherein any substantial cracking of the oil takes place, coincidentally applying pressure to the flow-stream during passage thereof through said heating zone to maintain the flow-stream substantially in the liquid phase, maintaining said mixture in said zone under said conditions of temperature and pressure for a sufficient period of time to effect polymerization of the more highly reactive unsaturated hydrocarbons, then passing the flow-stream under materially reduced pressures through a vaporizing zone maintained at a temperature to keep in a vaporous state the desired treated oils and separate therefrom higher boiling polymerized oils and said treating agent, and returning a portion, at least, of said polymerized oils and treating agent to said heating zone for re-passage through said heating zone in admixture with fresh oils.

3. The method of decolorizing and degumming low boiling cracked petroleum oils which comprises: continuously heating a confined flow-stream composed of such an oil and a finely divided solid treating agent during passage thereof through a heating zone to a temperature above the vaporization point of the oil but not sufficiently high to appreciably crack the same, coincidentally applying pressures to the flow-stream while in said heating zone to maintain the same substantially in the liquid phase, maintaining said mixture in said zone under said conditions of temperature and pressure for a sufficient period of time to effect polymerization of the more highly reactive unsaturated hydrocarbons, removing the flow-stream from said heating zone and passing the same under reduced pressures into a vaporizing zone, removing from the upper portion of said vaporizing zone in a vaporous state the desired oils, fractionating the vapors of said oils to remove entrained high boiling liquids, condensing and collecting said desired vapors, separately removing from said vaporizing zone the high boiling polymerized oils formed in said heating zone and said treating agent, and passing a portion, at least of the polymer treating agent fraction to the flow-stream of fresh oil entering the heating zone.

4. A process for removing gum-forming and color-imparting bodies from cracked low boiling petroleum oils which comprises: passing a confined flow-stream composed of an oil to be treated and a finely divided solid treating agent through a heating zone and heating the oils of said flow-stream to a temperature above the vaporization point thereof but below a temperature at which material cracking of the oil will be effected, maintaining said flow-stream during its passage through said heating zone under pressures sufficiently high to keep the oils of said stream in substantially the liquid phase, retaining said mixture in said zone under said conditions of temperature and pressure for a sufficient period of time to effect polymerization of the more highly reactive unsaturated hydrocarbons, reducing the pressure on the flow-stream immediately upon its discharge from the heating zone to permit of the free evolution of oil vapor in a vaporizing zone, separating in said vaporizing zone vapors of the desired low boiling oils from a fraction composed of high boiling polymerized oils containing said objectionable constituents and treating agent, fractionating, condensing and collecting the vapors of the treated oils discharged from said vaporizing zone, separately collecting in a storage zone the high boiling polymerized oils and treating agent, and returning a portion of said polymerized oils and treating agent to the heating zone for re-passage through the latter while in an admixed condition with the oils comprising said flow-stream.

In testimony whereof I affix my signature.

RUDOLPH C. OSTERSTROM.